United States Patent
Komer

(10) Patent No.: US 10,236,095 B1
(45) Date of Patent: Mar. 19, 2019

(54) WIRING HARNESS

(71) Applicant: John M. Komer, Canton, OH (US)

(72) Inventor: John M. Komer, Canton, OH (US)

(73) Assignee: Thermtrol Corporation, North Canton, OH (US)

( * ) Notice: Subject to any disclaimer, the term of this patent is extended or adjusted under 35 U.S.C. 154(b) by 0 days.

(21) Appl. No.: 15/283,546

(22) Filed: Oct. 3, 2016

Related U.S. Application Data

(60) Provisional application No. 62/236,253, filed on Oct. 2, 2015.

(51) Int. Cl.

| | |
|---|---|
| *G02B 6/00* | (2006.01) |
| *H01B 7/00* | (2006.01) |
| *H01B 7/08* | (2006.01) |
| *H01B 3/44* | (2006.01) |
| *H01B 3/42* | (2006.01) |
| *H01B 17/26* | (2006.01) |
| *F21V 5/04* | (2006.01) |
| *F21V 23/06* | (2006.01) |
| *F21V 31/00* | (2006.01) |
| *G02B 6/44* | (2006.01) |
| *F21V 23/00* | (2015.01) |
| *F21Y 115/10* | (2016.01) |

(52) U.S. Cl.
CPC ............. *H01B 7/0045* (2013.01); *F21V 5/04* (2013.01); *F21V 23/001* (2013.01); *F21V 23/06* (2013.01); *F21V 31/005* (2013.01); *G02B 6/4471* (2013.01); *H01B 3/427* (2013.01); *H01B 3/443* (2013.01); *H01B 7/0823* (2013.01); *H01B 17/26* (2013.01); *F21Y 2115/10* (2016.08)

(58) Field of Classification Search
CPC ...... H01B 7/0045; H01B 3/443; H01B 3/427; H01B 17/26; H01B 7/0823; F21V 5/04; F21V 23/06; F21V 31/005; F21V 23/001; G02B 6/4471; F21Y 2115/10
See application file for complete search history.

(56) References Cited

U.S. PATENT DOCUMENTS

| | | | | |
|---|---|---|---|---|
| 4,705,339 A | * | 11/1987 | Hayes .................. | H01R 13/432 439/277 |
| 5,053,583 A | * | 10/1991 | Miller .................. | H01B 7/0892 174/115 |
| 5,110,224 A | * | 5/1992 | Taylor .................. | G02B 6/4448 174/70 S |
| 5,888,083 A | * | 3/1999 | Seilhan ................ | H01R 13/523 439/161 |
| 6,451,398 B1 | * | 9/2002 | Sylvester ................ | B29C 44/06 160/40 |
| 6,783,396 B1 | * | 8/2004 | Osterhart ............. | H01R 13/521 439/587 |

(Continued)

Primary Examiner — Ellen Kim
(74) Attorney, Agent, or Firm — Alvin T. Rockhill

(57) ABSTRACT

This invention discloses a wiring harness, a method of manufacturing said wiring harness, and a lamp assembly which utilizes said wiring harness. The wiring harness is comprised of a plurality of insulated conductive electrical wires which extend through a modular connector plug. The modular connector plug is comprised of a molded wire matrix and a mounting plug. To manufacture the wiring harness, a molded wire matrix is overmolded onto a plurality of insulated conductive electrical wires and then a mounting plug is overmolded onto the wire matrix.

19 Claims, 9 Drawing Sheets

(56) References Cited

U.S. PATENT DOCUMENTS

| | | | |
|---|---|---|---|
| 7,614,910 B2 * | 11/2009 | Croteau | H01R 13/512 |
| | | | 439/559 |
| 8,277,245 B2 * | 10/2012 | Fix | H02G 3/32 |
| | | | 439/497 |
| 9,120,435 B2 | 9/2015 | Shirey et al. | |
| 9,136,048 B2 | 9/2015 | Takahashi et al. | |
| 9,147,508 B2 | 9/2015 | Imahori et al. | |
| 9,484,126 B2 * | 11/2016 | Furukawa | C08L 27/06 |
| 9,664,705 B2 * | 5/2017 | Cobb, III | G01P 3/481 |
| 2002/0004336 A1 * | 1/2002 | Yamaguchi | G02B 6/3817 |
| | | | 439/577 |
| 2002/0048994 A1 * | 4/2002 | Oota | H01R 9/24 |
| | | | 439/98 |
| 2004/0229508 A1 * | 11/2004 | Miyazaki | H01R 9/0521 |
| | | | 439/607.01 |
| 2010/0264800 A1 * | 10/2010 | Liu | F21V 29/51 |
| | | | 313/46 |
| 2015/0078720 A1 * | 3/2015 | Sedor | G02B 6/4472 |
| | | | 385/137 |
| 2015/0146444 A1 * | 5/2015 | Ovenshire | B60Q 1/56 |
| | | | 362/497 |
| 2016/0149383 A1 * | 5/2016 | Banaczuk | G08B 13/12 |
| | | | 340/568.4 |

\* cited by examiner

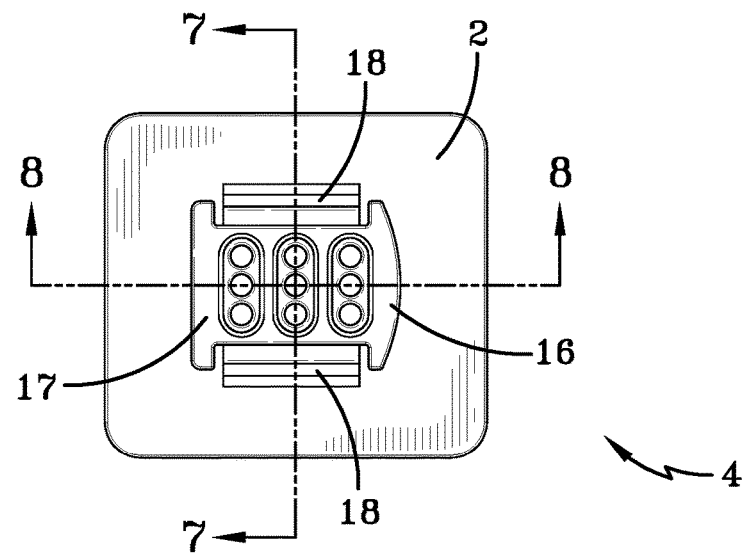
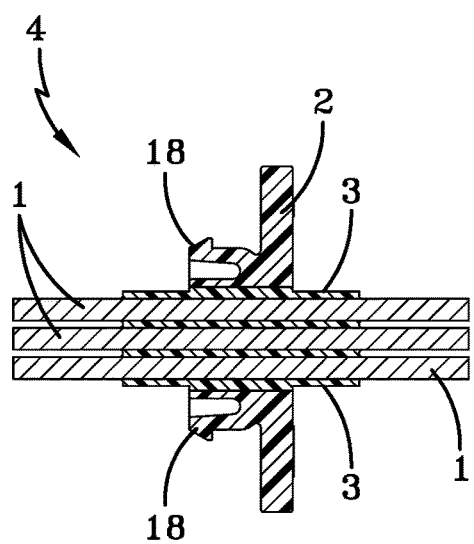
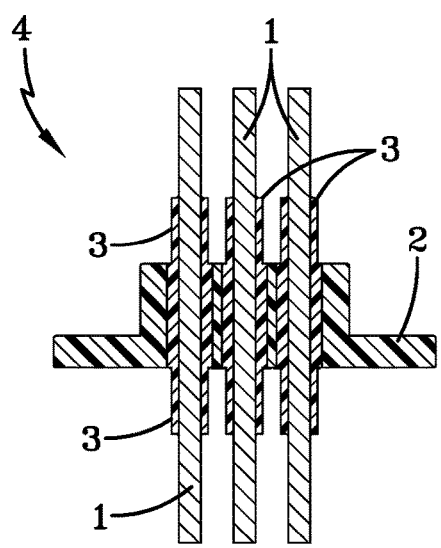
FIG-6
FIG-7
FIG-8

WIRING HARNESS

This application claims the benefit of U.S. Provisional Patent Application Ser. No. 62/236,253 filed on Oct. 2, 2015. The teachings of U.S. Provisional Patent Application Ser. No. 62/236,253 are incorporated herein by reference in their entirety.

BACKGROUND OF THE INVENTION

Wiring harnesses are commonly used in automobiles, aircraft, spacecraft, watercraft, industrial equipment, alarm systems, sound systems, computer systems, and various types of machinery or electronics which require conductive wire. Wiring harnesses function to bind wires together in an organized manner and protect them against dirt, moisture, and the adverse effects of vibration and abrasion. Wiring harnesses can be configured to provide one connection point for multiple wiring configurations.

U.S. Pat. No. 9,147,508 describes a wire holding device with a seal holding member having an insertion hole into which an electric wire is inserted into an opening. The seal holding member being configured to be housed in an attachment hole formed on an attachment target, an outer periphery sealing member for sealing a gap between an inner surface of the attachment target inside the attachment hole and the seal holding member, an inner periphery sealing member for sealing a gap between the electric wire and the seal holding member, and a wire holder aligned with the seal holding member along the electric wire. The seal holding member and the wire holder are relatively movable in a circumferential direction to the electric wire.

U.S. Pat. No. 9,120,435 describes a wire harness holder for securing a wire harness to a panel. The wire harness holder includes a body including a fastening portion to fasten the body to the panel, a channel to receive the wire harness therein. The channel extends in a serpentine configuration so as to form a drip loop portion therein and is defined by a pair of opposed side walls connected by a bottom wall. The body further includes means for facilitating retention of the wire harness within the body. Similarly, U.S. Pat. No. 9,136,048 discloses a wire harness protector having a trunk wire insertion portion and a branch wire insertion portion that projects from a peripheral edge of a branch wire outlet provided to one or two side walls in a center length direction of the trunk wire insertion portion.

Wiring harnesses of the prior art are susceptible to becoming dislodged from their housing areas as a result of vibration or temperature changes. When wiring harnesses become dislodged, or if wiring harnesses sit loosely in their housing areas, the wires are prone to chafing which can ultimately lead to short circuits and even to wire breakage which creates an open circuit. As a result of chafing over time, the wires can become damaged and cause damage to any attached or nearby electrical devices. Prior art wiring harnesses are also costly to manufacture because multiple wiring harness molds are required to accommodate various wire arrangements and wire sizes.

The conventional procedures used in manufacturing connector plugs through which multiple wires pass are limited to geometric configurations which will allow for them to be manufactured by overmolding. More specifically, all of the wires passing through such conventional connector plugs must be aligned in the relatively straight row to allow for removal from the mold. This necessitates that the connector plug must be long enough in a given direction to allow for all of the wires to be aligned in that direction. This can put undesired limitations on the geometry of conventional connector plugs. This can be problematic in current applications in which it is necessary for dozens of wires to pass through a connector plug in a wiring harness. Accordingly, there is a need for a wiring harness having a connector plug therein which offers increased flexibility, higher reliability, better durability, and which can be manufactured in a more cost effective manner.

FIG. 1A, FIG. 1B, FIG. 2 and FIG. 3 depict wiring harnesses and their application in an automotive tail lamp assembly of the prior art. FIG. 1A is an exploded view showing the bulkhead 50 and an array of wires 51, a gasket 52, and a turnably tightenable plug 53 which is adapted for attachment to a hole 54 in the bulkhead 50. FIG. 1B illustrates the structure as assembled showing the array of wires 51 passing through the bulkhead 50 through the turnably tightenable plug 53. FIG. 2 depicts an automotive tail lamp assembly 55 which includes a wiring harness 56 with wires 51 which extend through the bulkhead 50 of the lamp assembly 55 into the internal cavity 57 thereof. As can be seen, the wires 51 pass from a connector 58 and they extend through the turnably tightenable plug 53 and ultimately extend to a lighting array 59 including a plurality of lights 60 such as incandescent lights, fluorescent lights, light emitting diodes (LEDs) or the like. This prior art design has the inherent problem associated with the turnably tightenable plug irreversibly engaging into the bulkhead which means it can fail to provide adequate sealing due to improper installation during assembly or loosening by vibration or other external factors over time. During assembly, the turnably tightenable plug must be pushed into the hole in the bulkhead with sufficient force against a gasket to provide for proper engagement to allow for the turnably tightenable plug to be rotated into a secure position. However, such conventional turnably tightenable plugs of the prior art do not typically lock into position to provide a reliable and permanent seal.

SUMMARY OF THE INVENTION

This invention is directed to a wiring harness, and a cost effective means of manufacturing said wiring harness with greatly improved flexibility in the manufacturing process. The wiring harness of this invention is of particular utility in applications where there is a need to pass a plurality of electrically conductive wires through a wall or solid structure in an article of manufacture. The wiring harness of this invention functions to protect the electrical wires therein from damage that can occur over time as a function of vibration, expansion and contraction that results from variations in temperature, product misuse, and a wide variety of other factors. The wiring harnesses of this invention also allow for more flexibility in the geometric design of the connector plugs therein. Such wiring harnesses can also typically be designed to include connector plugs which are smaller in size. Accordingly, the wiring harnesses of this invention can be used in manufacturing a wide variety of consumer and industrial products, such as automotive parts, aircraft parts, boat parts, agricultural equipment, construction equipment, computers, printers, modems, routers, telecommunications equipment, television sets, radios, architectural lamps, sign displays, vacuum cleaners, heating and cooling equipment, food processing equipment, and an almost endless variety of other electrical products. For instance, the wiring harness of this invention is of particular value for use in manufacturing modern automotive lamp assemblies which can include dozens of light emitting diodes (LEDs) which can be designed to operate independently and accordingly need to be wired separately.

The wiring harness of this invention can be used to environmentally seal and protect the inside of a housing area from moisture, dirt, dust, and other debris. The wiring harness can be permanently sealed to a housing or can be reversibly affixed thereto. In one embodiment of this invention a connector plug in the wiring harness snaps into the wall of the housing in a manner which permanently affixes it thereto. The connector plug can optionally also be further affixed to a housing area with a double sided adhesive. In another embodiment of this invention the wiring harness includes a connector plug having a screw connector which can be used to attach the wiring harness to the housing with the capability of removing it later if so desired.

This invention more specifically discloses a wiring harness comprising a plurality of insulated conductive electrical wires, wherein said plurality of insulated conductive electrical wires extend through a modular connector plug wherein the modular connector plug is comprised of a molded wire matrix and a mounting plug.

This invention further reveals a lamp assembly which is comprised of a housing, a lens, and a plurality of lights, wherein the housing includes a wire access orifice through which a plurality of insulated conductive electrical wires in a wiring harness pass, wherein the wiring harness is comprised of the plurality of insulated conductive electrical wires, wherein said plurality of insulated conductive electrical wires extend through a modular connector plug, wherein the modular connector plug is comprised of a molded wire matrix and a mounting plug, and wherein the wire access orifice is adapted to receiving the modular connector plug of the wiring harness.

This invention also discloses a method for manufacturing a wiring harness having a modular connector plug therein, comprising overmolding a molded wire matrix onto a plurality of insulated conductive electrical wires to produce a molded wire matrix and overmolding a mounting plug over the molded wire matrix to produce the wiring harness.

The subject invention further reveals a fiber optics cable harness comprising a plurality of fiber optic cables, wherein said plurality of fiber optic cables extend through a modular connector plug wherein the modular connector plug is comprised of a molded wire matrix and a mounting plug.

BRIEF DESCRIPTION OF THE DRAWINGS

FIG. 6 is an orthographic view of the bulkhead engaging side of a modular connector plug of this invention.

FIG. 7 is a cutaway view taken along line 7 of FIG. 6.

FIG. 8 is a cutaway view taken along line 8 of FIG. 6.

DETAILED DESCRIPTION OF THE INVENTION

Figure 5A:
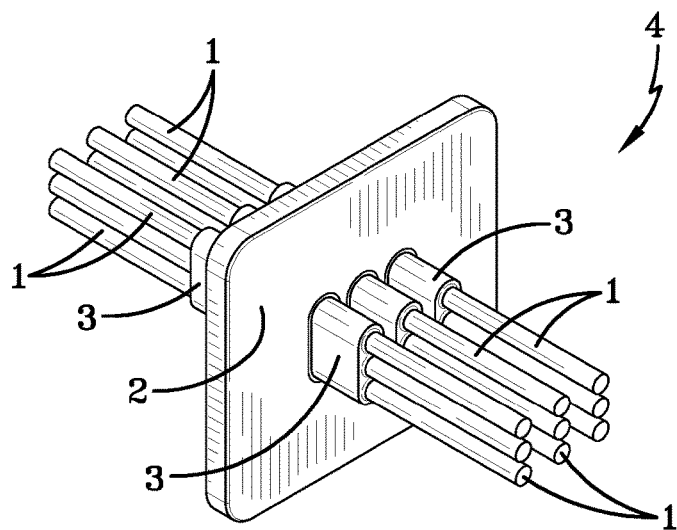
FIG. 5A is a perspective view illustrating the non-bulkhead engaging side of a modular connector plug of this invention.
Figure 5B:
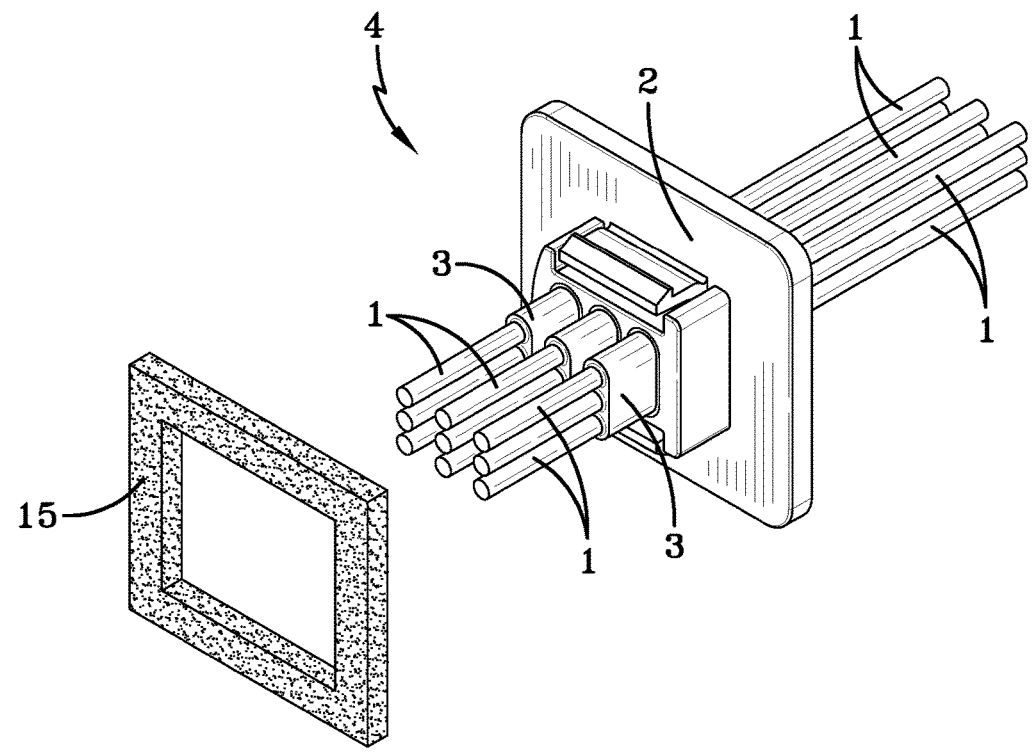
FIG. 5B is a perspective view illustrating the bulkhead engaging side of a modular connector plug of this invention.

FIG. 5A and FIG. 5B show a modular connector plug 4 which is used in the wiring harness 13 of this invention. It includes a plurality of insulated electrically conductive wires 1. In one embodiment of this invention the electrically conductive wires can be in ribbon cables. The plurality of insulated conductive electrical wires 1 may be uniformly sized or can be of different sizes. Conventional insulated electrically conductive wires 1 can be used in the practice of this invention and are typically coated with a polymeric material, such as plasticized polyvinyl chloride, polytetrafluoroethylene, silicon rubber, or a cross-linked polyolefin which can be a cross-linked polyethylene. The conductive agent in the electrically conductive material in the wire will typically be copper, a copper alloy or aluminum. However, it is contemplated that the wiring harness of this invention can also be used in non-metallic conductors such as fiber optic cables. In many applications the insulated conductive electrical wires 1 will have a temperature rating of at least 80° C. Frequently, the insulated conductive electrical wires 1 have a temperature rating of at least 100° C. with temperature ratings of at least 120° C. or even 200° C. being needed in some applications. In any case, the insulated electrical wires 1 will have a melting point which is high enough to survive the overmolding process used in making the molded wire matrix into which they are incorporated without being damaged.

The plurality of insulated conductive electrical wires 1 extend through a modular connector plug 4 as shown in FIGS. 5A and 5B. The modular connector plug 4 is comprised of a gasket 15, a molded wire matrix 3, and a mounting plug 2. The molded wire matrix 3 illustrated can be comprised of nylon or a wide variety of other thermoplastics. The mounting plug 2 as illustrated can be comprised of nylon, polycarbonate, acrylonitrile butadiene-styrene (ABS) polymer, a fiber filled thermoplastic, or the like. For instance, glass filled nylon can be used advantageously. In some embodiments of this invention the mounting plug 2 is asymmetrically designed to foolproof its subsequent attachment into the wall of the product in which it is being used. In other words, this allows for a design which implements the Japanese concept of "poka-yoke" to be used. Such a design is illustrated in FIG. 6 wherein the connector plug 4 is keyed in a poka-yoke manner having different profiles on opposite sides of the key. For example, as shown in FIG. 6 the poka-yoke key design having a rounded key component 16 and a straight key component 17. The connector plug illustrated in FIG. 6 also includes a latch mechanism 18 for permanently affixing the mounting plug into the bulkhead of a desired article of manufacture. A wide variety of catch mechanisms can be used in the practice this invention to permanently affix the modular connector plug 4 to the bulkhead of a desired article of manufacture.

Figure 1A:
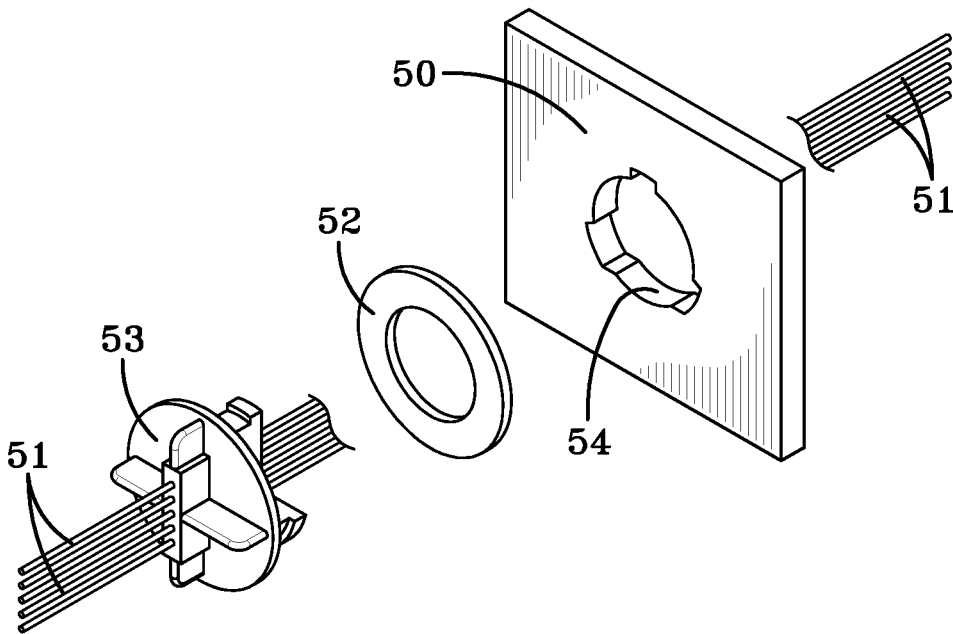
FIG. 1A is an exploded view of a wiring harness traversing a bulkhead of an apparatus needing electrical conductivity, such as electrical signals and/or electrical power.
Figure 1B:
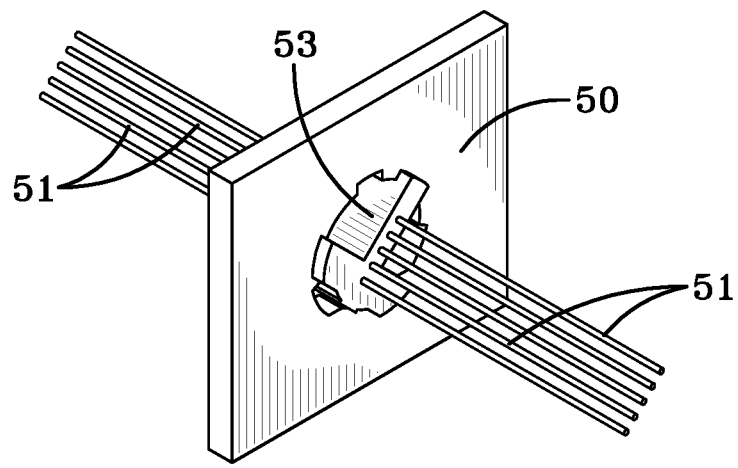
FIG. 1B illustrates a conventional wiring harness with wires extending through a bulkhead in a typical installation.
Figure 2:
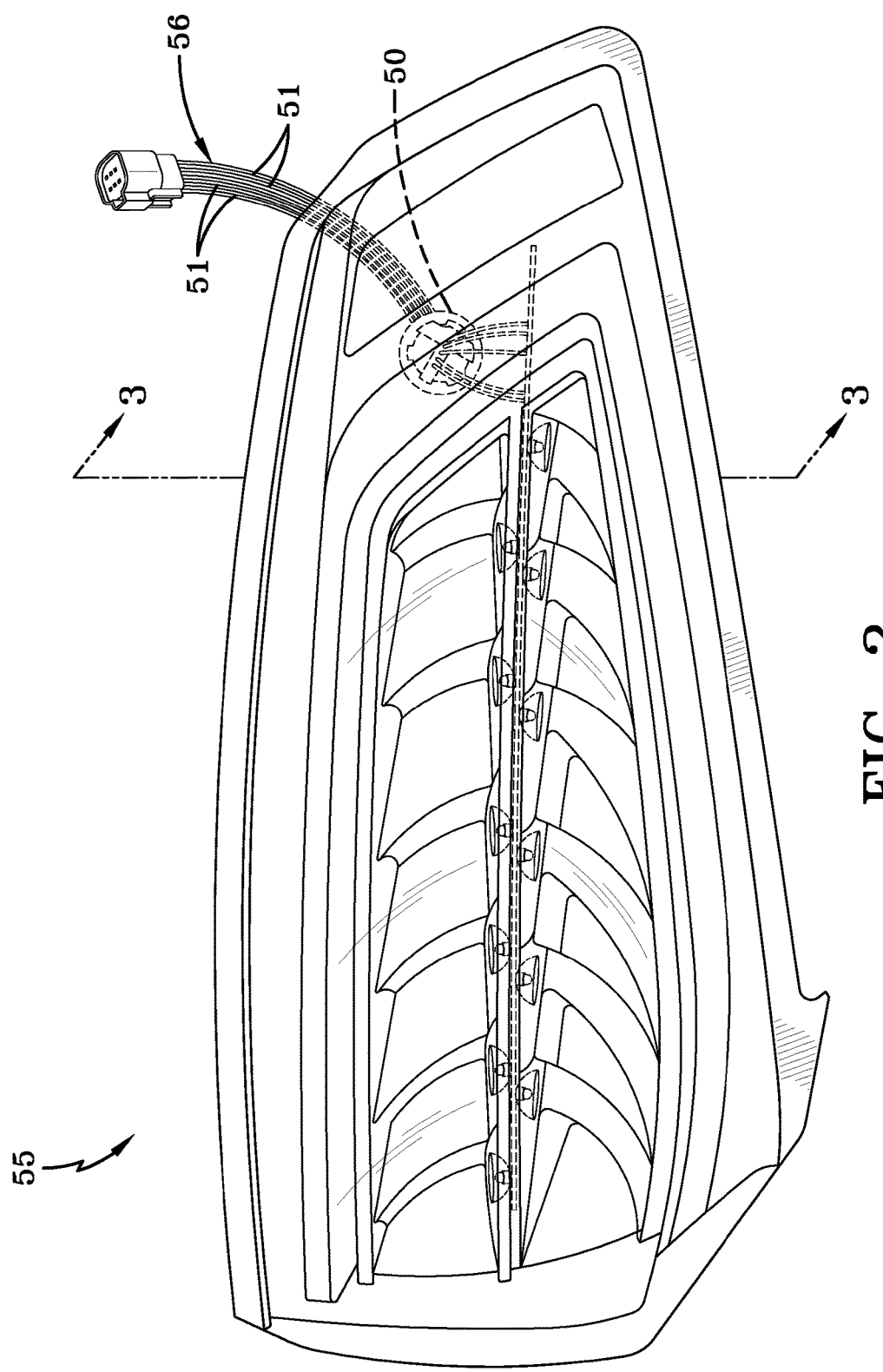
FIG. 2 shows an automotive lamp assembly including a conventional wiring harness.
Figure 3:
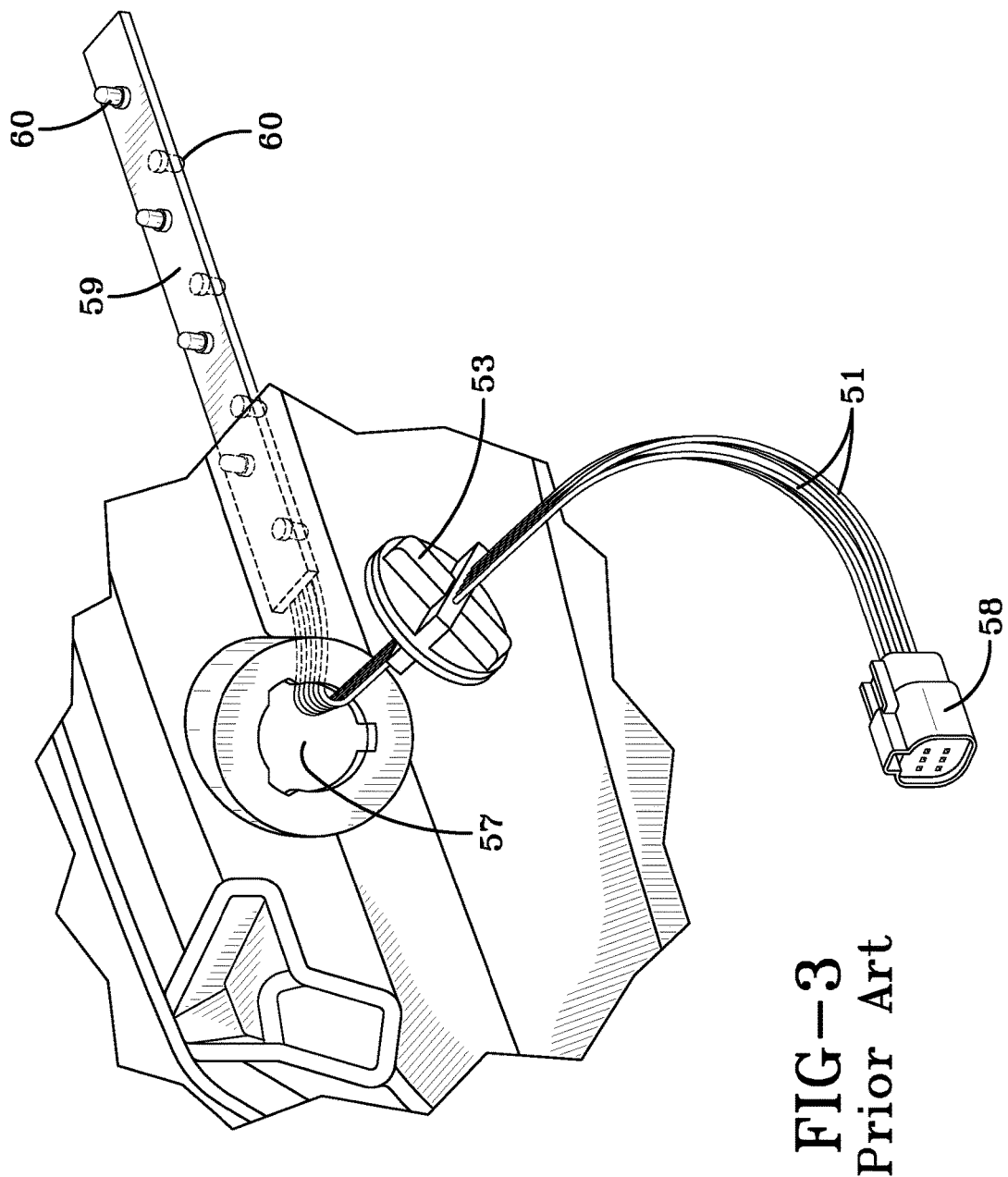
FIG. 3 shows a sectional view of the prior taken along line 3-3 of FIG. 2.
Figure 4:
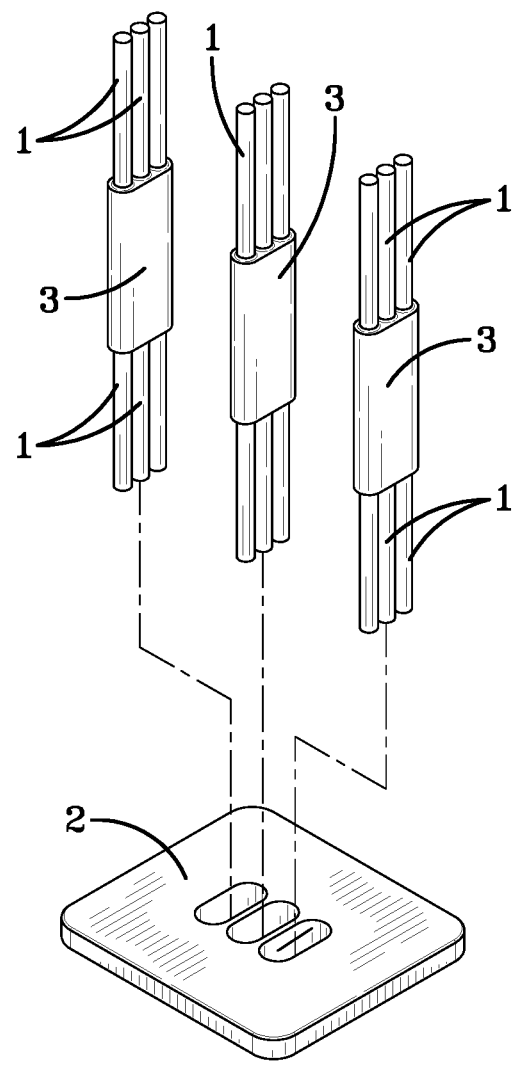
FIG. 4 is an exploded view showing a molded wire matrix used in the practice of this invention.
Figure 11:
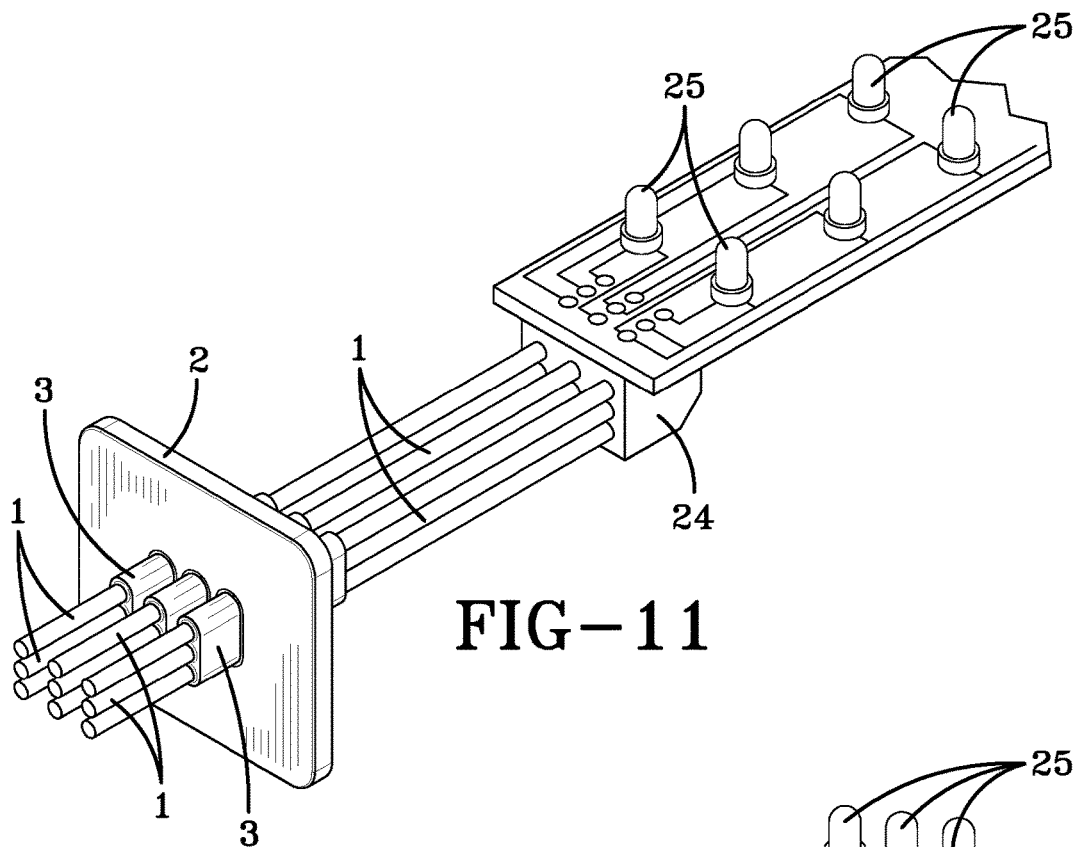
FIG. 11 illustrates the wiring harness of this invention connected to an integrated circuitry.
Figure 12:
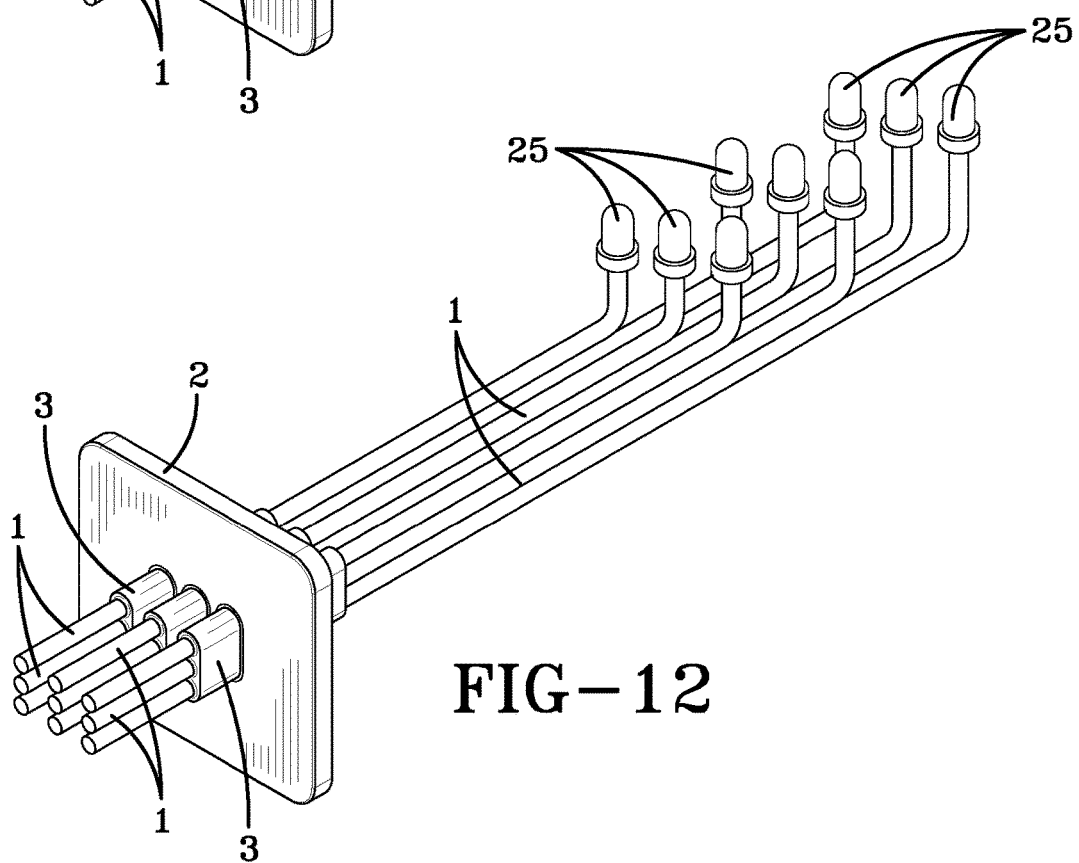
FIG. 12 illustrates the wiring harness of this invention attached to discrete LED's.

The plurality of wires 1 in the molded wire matrix 3 are arranged in a matrix array as illustrated in FIG. 4. Preferably the matrix 3 is at least a two by one matrix, but the matrix can be two by three, three by three, two by six, and so on to accommodate a multitude of wiring needs. The plurality of wires 1 have a beginning end 5 and a terminal end 6. The beginning end 5 of the wires are connected to a modular wire connector 12. The terminal end 6 can be non-terminated, or terminated with electrically conductive terminals. In either case, the terminal ends of the wires are connected to an integrated circuit 24 as illustrated in FIG. 11 or to discrete electrical components, such as light emitting diodes 25 as illustrated in FIG. 12.

Figure 10:
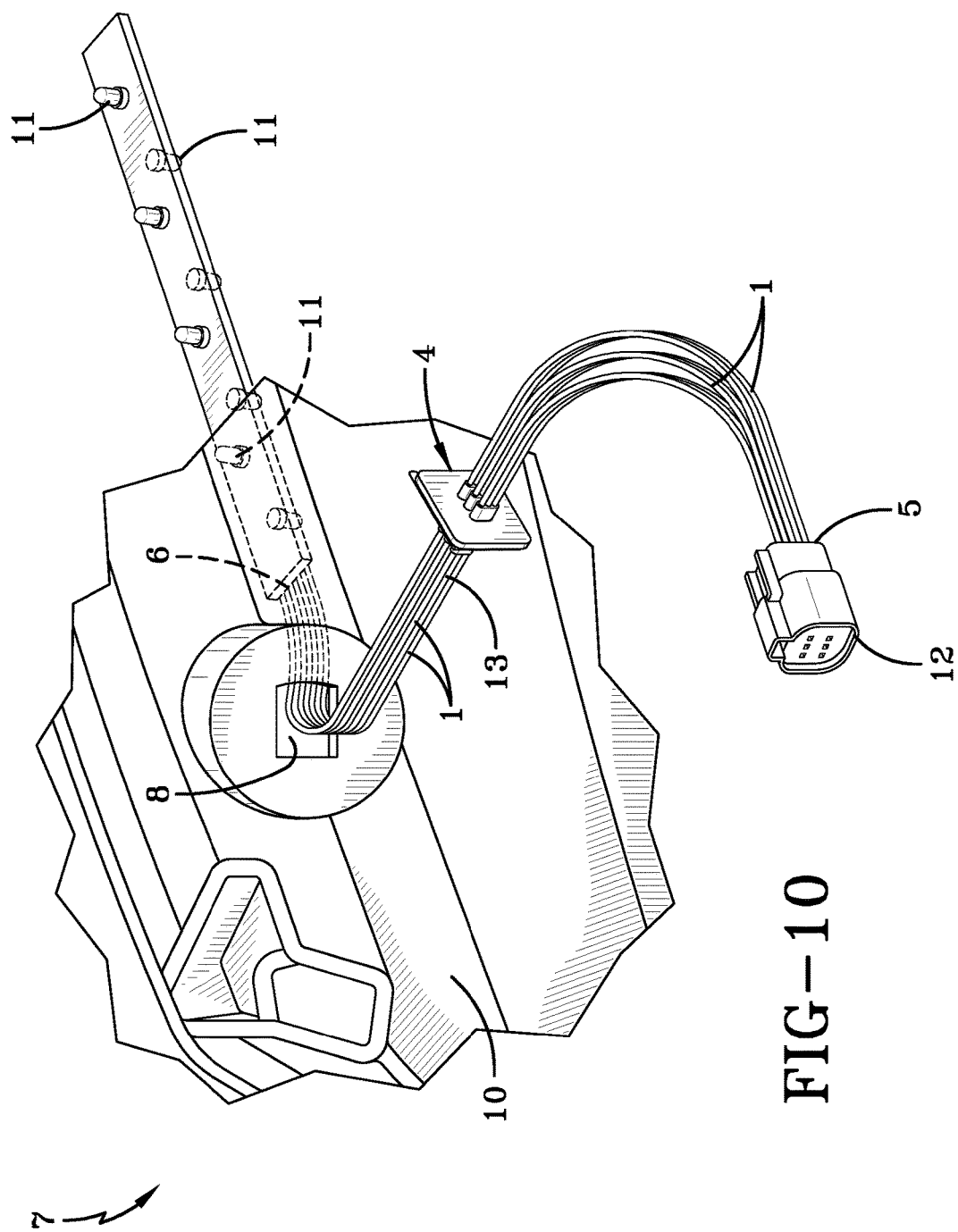
FIG. 10 shows the wiring harness of this invention extending into an automotive lamp assembly with the connector plug not yet being engaged with the lamp assembly.

FIG. 10 shows a portion of a lamp assembly 7 which is comprised of a housing 10, a lens, and a plurality of lights 11. The lights 11 can be LED lights, fluorescent bulbs or incandescent bulbs as desired to provide the appropriate illumination including color and intensity. The housing 10 includes a wire access orifice 8 through which the plurality of wires 1 pass. The housing 10 is adapted to receiving the modular connector plug 4 of the wiring harness 13. To properly attach to the housing 10, the modular connector plug 4 can be circular, rectangular, triangular, square or any other desirable regular or irregular geometric shape. The modular connector plug 4 can be affixed to the housing 10 using a reversible rotational locking mechanism, or the modular connector plug 4 can adapted to permanently lock in place on the housing 10. In one embodiment of this invention, the modular connector plug 4 is permanently locked onto the housing 10 with one or more locking tabs 14 located on the mounting plug 2 portion of the modular connector plug 4. Optionally, the modular connector plug 4 is further affixed to the housing 10 in an environmentally sealed manner, such as airtight and/or water tight, with a double-sided adhesive closed cell foam. A double sided adhesive compliments the mechanical means of securing the modular connector plug 4 to the housing 10 and can provide enhanced environmental sealing capability.

The wiring harness 13 of this invention is manufactured by overmolding. Overmolding is an efficient injection molding process whereby one material is molded over a secondary material; the two materials are then cost effectively and rapidly bonded together without using primers or adhesives. In this invention the molded wire matrix 3 is overmolded onto the plurality of insulated conductive electrical wires 1 as is best illustrated in FIG. 4. Then, the mounting plug 2 is overmolded onto the wire matrix 3 in producing the wiring harness 13. As illustrated in FIG. 7 and FIG. 8, the wires pass through the mounting plug 2 via the molded wire matrix 3. This manufacturing method offers a cost effective means of producing the wiring harness for at least two reasons. First, a single mounting plug mold can be used to produce a mounting plug 2 for numerous wire arrangements. For example, a wire matrix 3 constructed to hold two wires and a wire matrix constructed to hold 6 wires can both use the same sized mounting plugs 2. Using a single mounting plug mold eliminates the need for numerous mounting plug molds to suit different wiring needs. Second, a single wire matrix mold can be used to produce a wire matrix 3 for numerous wire arrangements. For example, a single wire matrix 3 can be constructed to include six wires, or that same wire matrix 3 can be constructed to include two wires, ribbon cables, or wires of different sizes. As long as the mounting plug 2 is sized appropriately to be overmolded onto the wiring matrix 3, a single mold can be used to create numerous mounting plugs 2 and a single mold can be used to create numerous wire matrices 3.

Figure 9A:
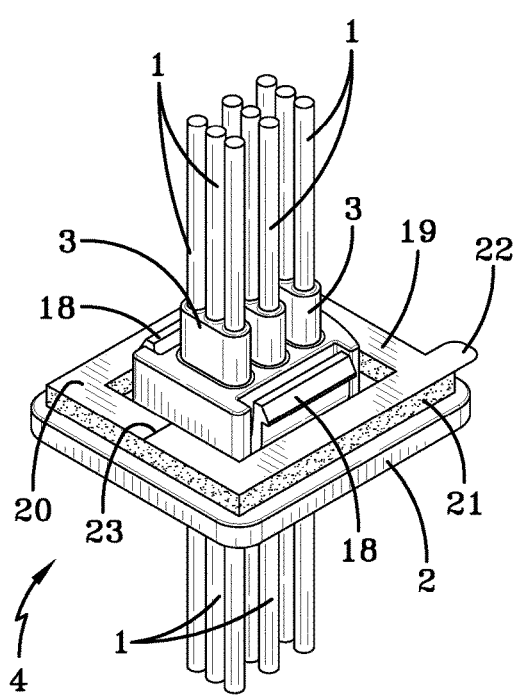
FIG. 9A is a top perspective view of the modular connector plug of this invention with a peel and stick adhesive tape affixed thereto.
Figure 9B:
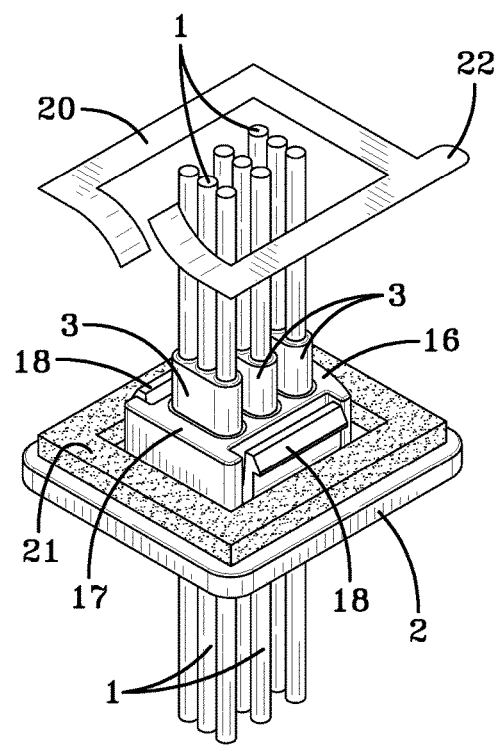
FIG. 9B is a top perspective view of the modular connector plug of this invention as depicted in FIG. 9A with the protective covering of the peel and stick adhesive tape in a disengaged position so as to expose the adhesive surface of the tape.

In one embodiment of this invention illustrated in FIGS. 9A and 9B, the mounting plug further includes the peel and stick adhesive 19 for better adhering the mounting plug to a bulkhead. The use of such an adhesive can also facilitate a tighter seal if desired. FIG. 9A illustrates the mounting plug with a protective cover 20 in place over the adhesive. FIG. 9B shows the protective cover disengaged from the mounting plug 2 so as to expose the adhesive 21. The protective cover includes a tab 22 to facilitate gripping the protective cover to facilitate removal as well as a slit 23 in the material in the covering preferably on the opposite side of the mounting plug to further facilitate easy removal of the protective cover 20.

The wire harness of this invention can be used in a wide array of applications wherein it is necessary for the wiring harness to extend through the wall or a bulkhead of an article of manufacture. For instance, the wiring harnesses of this invention can be utilized in automotive applications such as in automobiles, trucks and trailers, recreational vehicles, and the like. They can also be used in agricultural equipment, mining equipment, construction equipment, all terrain vehicles, aircraft, marine applications and the like. The wiring harness of this invention can also prove to be beneficial in manufacturing a wide variety of consumer and industrial applications such as vacuum cleaners, refrigerators, freezers, computer equipment, heating, ventilating and air-conditioning, and industrial robotics such as autonomous vehicular transport robots (BOTS) and pick-and-place equipment. The wiring harnesses of this invention can also be beneficial when utilized in a wide variety of small appliances such as blenders, coffee makers, mixers, toasters and the like. The wiring harnesses of this invention can also be used in toys such as remote control cars and boats. The wiring harnesses of this invention can also be used in windmills, drones, streetlights, outdoor signage, and the like.

While certain representative embodiments and details have been shown for the purpose of illustrating the subject invention, it will be apparent to those skilled in this art that various changes and modifications can be made therein without departing from the scope of the subject invention.

What is claimed is:

1. A wiring harness bulkhead plug comprising a plurality of insulated conductive electrical wires, wherein said plurality of insulated conductive electrical wires extend through a modular plug wherein the modular plug is comprised of a molded wire matrix and a mounting plug, wherein the molded wire matrix is overmolded onto the insulated conductive electrical wires, wherein the mounting plug is overmolded onto the molded wire matrix, wherein the plurality of insulated conductive electrical wires pass continuously through the mounting plug via the molded wire matrix, wherein the modular plug is adapted for permanent attachment to the bulkhead of an article of manufacture, wherein the insulated conductive electrical wires extend through the modular plug from a first side to a second side of the bulkhead, and wherein the mounting plug further includes a latch mechanism for permanently affixing the mounting plug to the bulkhead of the article of manufacture.

2. The wiring harness bulkhead plug as specified in claim 1 wherein the plurality of wires in the molded wire matrix are arranged in a matrix array.

3. The wiring harness bulkhead plug as specified in claim 2 wherein the matrix is at least a 2×1 matrix.

4. The wiring harness bulkhead plug as specified in claim 1 wherein the wires in the plurality of wires have a beginning end and a terminal end, wherein the beginning end of the wires are connected to a modular wire connector.

5. The wiring harness bulkhead plug as specified in claim 4 wherein the terminal ends of the plurality of the wires are terminated with electrically conductive terminals.

6. The wiring harness bulkhead plug as specified in claim 5, which is further comprised of an over molded bulkhead plug through which the plurality of wires pass at a point located between the modular plug and the beginning end of the plurality of wires.

7. The wiring harness bulkhead plug as specified in claim 1, wherein at least a portion of the plurality of wires are in ribbon cables.

8. The wiring harness bulkhead plug as specified in claim 1, wherein the insulated conductive electrical wires are insulated with a plasticized polyvinyl chloride.

9. The wiring harness bulkhead plug as specified in claim 1, wherein the insulated conductive electrical wires are insulated with a cross-linked polyethylene.

10. The wiring harness bulkhead plug as specified in claim 1, wherein the molded wire matrix is comprised of nylon.

11. The wiring harness bulkhead plug as specified in claim 1, wherein the mounting plug is comprised of a polymer composition selected from the group consisting of nylon, acrylonitrile butadiene-styrene terpolymer, polycarbonate, glass fiber filled nylon.

12. The wiring harness bulkhead plug as specified in claim 1, wherein mounting plug has asymmetrical configuration.

13. A lamp assembly which is comprised of a housing, a lens, and a plurality of light emitting diodes, wherein the housing includes a wire access orifice through which the plurality of wires in the wiring harness bulkhead plug specified in claim 1 pass and wherein the wire access orifice is adapted to receiving the modular plug of the wiring harness bulkhead plug.

14. The lamp assembly as specified in claim 1, wherein the modular plug is further affixed to the housing in an environmentally sealed manner.

15. A method for manufacturing a wiring harness bulkhead plug having a modular plug therein, comprising overmolding a molded wire matrix onto a plurality of insulated conductive electrical wires to produce a molded wire matrix and overmolding a mounting plug over the molded wire matrix to produce the wiring harness bulkhead plug, wherein the molded wire matrix is overmolded onto the insulated conductive electrical wires, wherein the mounting plug is overmolded onto the molded wire matrix, and wherein the plurality of insulated conductive electrical wires pass through the mounting plug via the molded wire matrix, wherein the modular plug is adapted for permanent attachment to the bulkhead of an article of manufacture, wherein the insulated conductive electrical wires extend continuously through the modular plug from a first side to a second side of the bulkhead, and wherein the mounting plug further includes a latch mechanism for permanently affixing the mounting plug to the bulkhead of the article of manufacture.

16. The wiring harness bulkhead plug as specified in claim 1 wherein the mounting plug further includes a peel and stick adhesive for adhering the mounting plug to the bulkhead of the article of manufacture.

17. The wiring harness bulkhead plug as specified in claim 1 wherein the latch mechanism for permanently affixing the mounting plug to the bulkhead of the article of manufacture is one or more locking tabs located on the mounting plug.

18. The wiring harness bulkhead plug as specified in claim 1 wherein the article of manufacture is a lamp assembly that includes light emitting diodes.

19. The wiring harness bulkhead plug as specified in claim 1 wherein the article of manufacture is an outdoor sign.

\* \* \* \* \*